United States Patent
Burrows

(10) Patent No.: US 10,449,616 B2
(45) Date of Patent: Oct. 22, 2019

(54) WELDING PROCESS

(71) Applicant: ROLLS-ROYCE plc, London (GB)

(72) Inventor: Eliot Burrows, Nottingham (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 15/690,787

(22) Filed: Aug. 30, 2017

(65) Prior Publication Data

US 2018/0065204 A1 Mar. 8, 2018

(30) Foreign Application Priority Data

Sep. 5, 2016 (GB) .................... 1614989.0

(51) Int. Cl.
*B23K 9/12* (2006.01)
*B23K 9/167* (2006.01)
(Continued)

(52) U.S. Cl.
CPC ............... *B23K 9/126* (2013.01); *B21J 15/28* (2013.01); *B23K 9/0026* (2013.01); *B23K 9/167* (2013.01); *B23K 31/02* (2013.01); *B25J 9/1692* (2013.01); *B25J 11/007* (2013.01); *G05B 15/02* (2013.01); *G05B 19/4207* (2013.01);
(Continued)

(58) Field of Classification Search
CPC ...... B23K 9/126; B23K 31/02; B23K 9/0026; B23K 9/167; B25J 9/1692; B25J 11/007; G05B 15/02; G05B 2219/45135; G05B 2219/45088; B21J 15/28
See application file for complete search history.

(56) References Cited

U.S. PATENT DOCUMENTS

| 4,613,743 A | 9/1986 | Nied et al. |
| 5,380,978 A | 1/1995 | Pryor |

(Continued)

FOREIGN PATENT DOCUMENTS

| CN | 101927391 A | 12/2010 |
| CN | 104959719 A | 10/2015 |

(Continued)

OTHER PUBLICATIONS

Mar. 13, 2017 Search Report issued in British Patent Application No. GB1614989.0.

*Primary Examiner* — Charles R Kasenge
(74) *Attorney, Agent, or Firm* — Oliff PLC

(57) ABSTRACT

A method and apparatus for welding a first component to a second component. A scanning head is positionally calibrated within a localised work envelope including the components, the positional calibration being referenced to at least one datum feature within the work envelope. Profiles of the components are scanned within the localised work envelope using the calibrated scanning head. A cloud point data image of defined coordinate positions of surfaces and edges to be welded within a space envelope is generated from the scanned profiles. A robotic welding torch electrode tip is scanned using the calibrated scanning head to determine a defined coordinate position of the electrode tip within the space envelope. The components are welded using the torch, the torch controlled using the cloud point data image and the defined coordinate position such that the electrode tip is held at pre-determined stand-off positions around the components during the welding.

11 Claims, 1 Drawing Sheet

Figure 1:
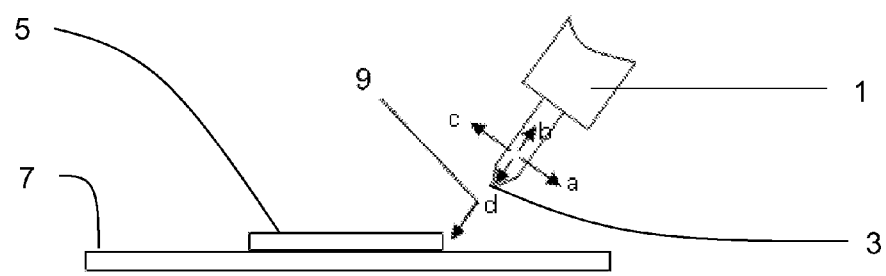

(51) Int. Cl.
*B21J 15/28* (2006.01)
*B25J 11/00* (2006.01)
*G05B 15/02* (2006.01)
*B23K 9/00* (2006.01)
*B25J 9/16* (2006.01)
*B23K 31/02* (2006.01)
*G05B 19/42* (2006.01)

(52) U.S. Cl.
CPC ........... *G05B 2219/36401* (2013.01); *G05B 2219/45088* (2013.01); *G05B 2219/45135* (2013.01)

(56) References Cited

U.S. PATENT DOCUMENTS

| | | | |
|---|---|---|---|
| 5,572,102 | A | 11/1996 | Goodfellow et al. |
| 5,643,478 | A | 7/1997 | Dillet et al. |
| 6,750,426 | B2 | 6/2004 | Veikkolainen et al. |
| 7,034,249 | B2 | 4/2006 | Gustafsson et al. |
| 7,605,347 | B2 * | 10/2009 | Izawa ................ B23K 9/032 |
| | | | 219/124.34 |
| 10,016,834 | B2 * | 7/2018 | Takayama ............ B23K 9/173 |
| 2005/0065653 | A1 * | 3/2005 | Ban ....................... B25J 9/1697 |
| | | | 700/245 |
| 2005/0096792 | A1 * | 5/2005 | Watanabe .............. B25J 19/023 |
| | | | 700/245 |
| 2005/0103766 | A1 * | 5/2005 | Iizuka ................. B23K 9/0216 |
| | | | 219/124.34 |
| 2007/0145027 | A1 * | 6/2007 | Izawa .................... B23K 9/032 |
| | | | 219/124.34 |
| 2009/0118864 | A1 * | 5/2009 | Eldridge ............... B25J 9/1692 |
| | | | 700/259 |
| 2013/0119040 | A1 * | 5/2013 | Suraba ................. B23K 9/0953 |
| | | | 219/137 R |
| 2014/0014637 | A1 * | 1/2014 | Hunt ..................... B25J 9/1689 |
| | | | 219/124.22 |
| 2015/0246406 | A1 * | 9/2015 | Takayama .............. B23K 9/173 |
| | | | 219/124.1 |
| 2017/0355008 | A1 * | 12/2017 | Potocki ................. B21D 35/002 |

FOREIGN PATENT DOCUMENTS

| | | |
|---|---|---|
| DE | 42 01 523 A1 | 7/1993 |
| GB | 2 318 885 A | 5/1998 |
| WO | 2016/046623 A1 | 3/2016 |
| WO | 2016/209583 A1 | 12/2016 |

* cited by examiner

WELDING PROCESS

FIELD OF THE INVENTION

The present invention relates to a method and apparatus for welding a first component to a second component.

BACKGROUND

In known manual and semi-automatic welding processes, location of component edge and surface height is typically reliant on an operators 'hand to eye' coordination. There may be some part-to-part variation in parts to be welded, including, for example, edge or surface variation between parts. Accordingly, it may be necessary to make adjustments to the welding process to accommodate for such part-to-part variation. Typically, this is achieved by manual operator adjustment. The quality of weld produced can therefore vary, depending on the skill of the operator. Control of component edge and surface height location in relation to the weld torch electrode position during welding is important, as variation of these parameters may have large impact on resultant weld quality. Variable weld quality between products is undesirable from a view of achieving high production repeatability between parts. Additionally, variable weld quality can lead to reduced predictability in estimating the expected lifetime of the welded product.

To remove or reduce the effect of manual operator influence on variability of the welding process, it is known to automate, or semi-automate, welding processes. However, this suffers a problem that robotic automation removes the visual feedback loop and control provided by the operator for detection of component edge location and surface height. Accordingly, where there is 'part-to-part' edge or surface variation, there remains a problem of variation in weld quality, and repeatability of the welding process, even in an automated or semi-automated process.

SUMMARY

The present invention aims to address the above problems. In a general aspect, the present invention provides location and spatial relationship capability to a robotic welding process.

Thus, in a first aspect, the present invention provides a method for welding a first component to a second component, including:
  positionally calibrating a scanning head within a localised work envelope including the first component and the second component, the positional calibration being referenced to at least one datum feature within the work envelope;
  scanning profiles of the first component and the second component within the localised work envelope using the calibrated scanning head;
  generating from the scanned profiles a cloud point data image of defined coordinate positions of surfaces and edges to be welded within a space envelope;
  scanning an electrode tip of a robotic welding torch using the calibrated scanning head to determine a defined coordinate position of the electrode tip within the space envelope; and
  welding the first component to the second component using the robotic welding torch, wherein the robotic welding torch is controlled using the cloud point data image and the defined coordinate position of the electrode tip such that the electrode tip is held at predetermined stand-off positions around the components during the welding.

Note that it is not necessary to perform the steps of the method in the order stated above. For example, it is possible to scan the electrode tip of the robotic welding torch before scanning the profiles of the first component and the second component within the localised work envelope.

In a second aspect, the invention provides a computer control system programmed to control a scanning head and a robotic welding torch to perform the method of the first aspect.

In a third aspect, the invention provides an apparatus for welding a first component to a second component, including: a scanning head; a robotic welding torch; and the computer control system of the second aspect. For example, an apparatus for welding a first component to a second component, may include;
  a scanning head;
  a robotic welding torch; and
  a computer control system;
  wherein the computer control system is programmed to:
  positionally calibrate the scanning head within a localised work envelope including the first component and the second component, the positional calibration being referenced to at least one datum feature within the work envelope;
  use the scanning head to scan profiles of the first component and the second component within the localised work envelope using the calibrated scanning head;
  generate from the scanned profiles a cloud point data image of defined coordinate positions of surfaces and edges to be welded within a space envelope;
  use the scanning head to scan an electrode tip of the robotic welding torch to determine a defined coordinate position of the electrode tip within the space envelope; and
  use the robotic welding torch to weld the first component to the second component, wherein the robotic welding torch is controlled by the control system using the cloud point data image and the defined coordinate position of the electrode tip such that the electrode tip is held at pre-determined stand-off positions around the components during the welding.

The present invention can therefore provide the ability to remove operator influence and operator-to-operator variation from the welding process, whilst retaining the ability to compensate for part-to-part variation between components to be welded, by providing image-based control of the welding process.

Typically the localised work envelope is a region in which the welding of the first component to the second component occurs. Thus the size of the localised work envelope may be a similar order of magnitude, or slightly bigger, than that of the welded components. Thus calibration of the scanning head with reference to at least one datum feature located within the localised work envelope, and scanning the profile of the first and second components with the localised work envelope, enables the invention to reduce the effect of robotic repeatability inaccuracies by reducing or minimising the travel range of the scanning head post calibration.

By scanning the position of the electrode tip to determine a defined coordinate position of the electrode tip within the space envelope, the invention can also reduce or minimise the impact of variation in the electrode setting process on weld repeatability between multiple electrodes. Typically the space envelope is a region containing the localised work envelope.

The invention may thus improve both weld quality and repeatability, and corresponding product quality and repeatability. This may decrease product unit cost and lead-time, and can also improve predictability in estimating the expected lifetime of the welded product.

Further aspects of the present invention provide: a computer program comprising code which, when run on a computer, causes the computer to control a scanning head and a robotic welding torch to perform the method of the first aspect; and a computer readable medium storing a computer program comprising code which, when run on a computer, causes the computer to control a scanning head and a robotic welding torch to perform the method of the first aspect.

Optional features of the invention will now be set out. These are applicable singly or in any combination with any aspect of the invention.

The scanning head may be positionally calibrated along x, y, z linear orthogonal axes within the localised work envelope. There is at least one, and there may be multiple datum features located within the localised work envelope, to assist in positional calibration of the scanning head. Datum features may be located on, for example, the first and/or second components to be welded. Alternatively or additionally, datum features may be located on a support structure to which the first and/or second components are mounted. The, or each, datum feature may consist of a slot, pocket, hole, face or any other artefact that can provide a suitable calibration feature for the scanning head.

Before positionally calibrating the scanning head, the method may include a further step of positioning the scanning head by reference to a master theoretical model of the first and second components' positions within the space envelope. This can facilitate positioning of the scanning head in the correct general position with relation to the first and second components.

The scanning head may be attached to a robotic arm. The robotic arm may be moveable. In particular, the robotic arm may have a first orientation for scanning profiles of the first component and the second component, and a second orientation for scanning the electrode tip of the robotic welding torch. The robotic arm may be controllable to move between these two orientations.

The method may further include a step of determining, from the cloud point data image of surfaces and edges to be welded, whether predetermined weld joint characteristics are satisfied, such that the welding of the first component to the second component can be stopped in the case that predetermined weld joint characteristics are not satisfied. This determination may be considered a pre-weld inspection step. The predetermined joint characteristics may include alignment of the first and second component, or join fit up. For example, if it is determined that the first and second components are mal-aligned, conditional stops may be applied to stop or prevent welding of the first and second components. This determination step has a benefit over similar steps performed by a manual operator n conventional processes, as actual variable data can be obtained from the scanned images, rather than subjective attribute data obtained by e.g. human visual inspection.

The scanning head may include a 3D optical visualiser that scans and characterises the geometry of the components to be welded. This can enable vision-based control of the welding process. For example, the scanning head may include a line laser and CCD camera setup, such as that used in DE4201523A. However, any suitable scanning head which is capable of scanning profiles of the components to be welded such that a cloud point data image of defined coordinate positions of surfaces and edges may be generated from the scanned profiles may be used. For example, a tactile scanning probe (e.g. from a coordinate measuring machine) could be used.

The welding to be performed may be tungsten inert gas (TIG) welding, but may also be applicable to other welding processes, including, but not limited to, laser (e.g. fibre laser), plasma and resistance welding. The welding process is not particularly restricted to a particuar welding geometry. The invention may be particularly advantageous in a lap welding, or a butt welding configuration, but may also be used in, for example, fillet welding or other joint geometries. The welding process is also not particularly restricted to materials, or material thicknesses.

Whilst the invention has so far been discussed in relation to welding, it can also be applied in relation to other types of assembly, such as mechanical fastening. More particularly, the robotic welding torch can be replaced by a robotic mechanical fastener having a fastening tool instead of a welding torch. This can be used to automate manual assembly operations such as riveting, bolting etc. by using the vision capability for detection of hole positions in relation to fasteners and for gap checking where consistent gap setting is required. Benefits can be reduced process cost, improved product quality, and process repeatability.

Thus in a fourth aspect, the invention provides a method for mechanically fastening (e.g. riveting, bolting etc.) a first component to a second component, including:

positionally calibrating a scanning head within a localised work envelope including the first component and the second component, the positional calibration being referenced to at least one datum feature within the work envelope;

scanning profiles of the first component and the second component within the localised work envelope using the calibrated scanning head;

generating from the scanned profiles a cloud point data image of defined coordinate positions of surfaces and edges to be assembled within a space envelope;

scanning a fastening tool (e.g. a handling gripper, rivet gun etc.) of a robotic mechanical fastener using the calibrated scanning head to determine a defined coordinate position of the fastening tool within the space envelope; and fastening the first component to the second component using the robotic mechanical fastener, wherein the robotic mechanical fastener is controlled using the cloud point data image and the defined coordinate position of the fastening tool such that the fastening tool is held at pre-determined stand-off positions around the components during the fastening.

In a fifth aspect, the invention provides a computer control system programmed to control a scanning head and a robotic mechanical fastener to perform the method of the fourth aspect.

In a sixth aspect, the invention provides an apparatus for mechanically fastening a first component to a second component, including: a scanning head; a robotic mechanical fastener; and the computer control system of the fifth aspect. For example, an apparatus for mechanically fastening a first component to a second component, may include:

a scanning head;

a robotic mechanical fastener; and a computer control system;

wherein the computer control system is programmed to:

positionally calibrate the scanning head within a localised work envelope including the first component and the second component, the positional calibration being referenced to at least one datum feature within the work envelope;

use the scanning head to scan profiles of the first component and the second component within the localised work envelope using the calibrated scanning head;

generate from the scanned profiles a cloud point data image of defined coordinate positions of surfaces and edges to be assembled within a space envelope;

use the scanning head to scan a fastening tool of the robotic mechanical fastener to determine a defined coordinate position of the fastening tool within the space envelope; and use the robotic mechanical fastener to fasten the first component to the second component, wherein the robotic mechanical fastener is controlled by the control system using the cloud point data image and the defined coordinate position of the fastening tool such that the fastening tool is held at pre-determined stand-off positions around the components during the fastening.

Further aspects of the present invention provide: a computer program comprising code which, when run on a computer, causes the computer to control a scanning head and a robotic mechanical fastener to perform the method of the fourth aspect; and a computer readable medium storing a computer program comprising code which, when run on a computer, causes the computer to control a scanning head and a robotic mechanical fastener to perform the method of the fourth aspect. Brief Description of the Drawings.

Figure 2:
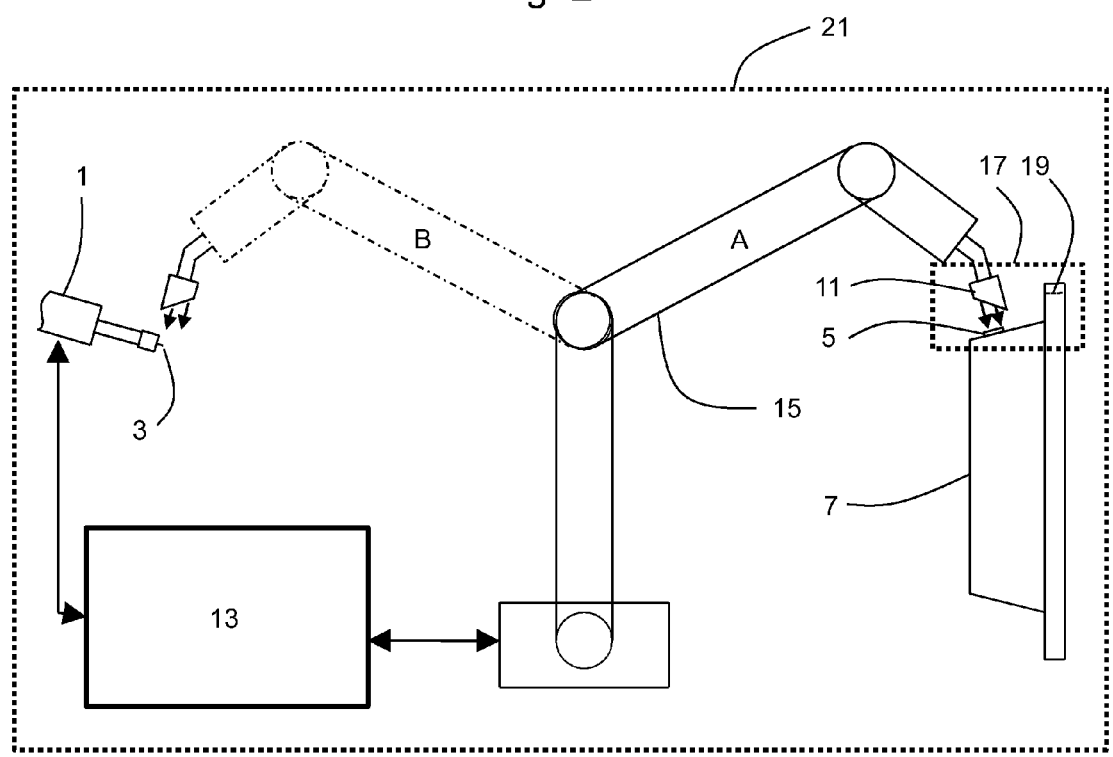

Embodiments of the invention will now be described by way of example with reference to the accompanying drawings in which:

FIG. 1 shows schematically location of a welding torch in relation to components to be welded; and FIG. 2 shows schematically an apparatus for welding a first component to a second component.

DETAILED DESCRIPTION AND FURTHER OPTIONAL FEATURES

FIG. 1 shows schematically location of a welding torch 1 having an electrode tip 3 in relation to first 5 and second 7 components to be welded along a work piece join 9. Directions a, b, c, d show possible relative movement of the welding torch in relation to the work piece join. For example, directions a, c relate to offset of the electrode tip from the component edge, and directions b, d relate to the stand-off distance of the electrode tip from the work piece join. The position of the electrode tip in each of these directions a, b, c, d is controlled during welding of the first and second components along the work piece join 9 in order to control component edge and surface height location in relation to the weld torch electrode position. Accurate control over these factors can improve the quality of the resultant weld produced.

FIG. 2 shows an apparatus for welding the first component 5 to the second component 7. The apparatus includes a scanning head 11, a robotic welding torch 1 and a control system 13. Here, the scanning head is conveniently attached to a robotic arm 15 having a first orientation A for scanning profiles of the first component and the second component, and a second orientation B for scanning the electrode tip 3 of the robotic welding torch.

The scanning head 11 may incorporate a line laser and CCD camera setup, such as that described in DE4201523A, to perform the scanning. For example, a suitable 3D optical vision system may be the VIRO WSI Weld Seam Inspection provided by Vitronic™ system. This can be robot or gantry-mounted and is conventionally used to scan and characterise the geometry of completed weld joints using laser line and optical sensors to subsequently measure and record the weld seam length, width, position, volume and height relative to the surrounding parent material. However, in the present apparatus, the optical vision system is used to scan profiles of the components 5, 7 before they are welded. The VIRO WSI system uses a 3D stripe measurement principle, which is a triangulation method involving moving the weld under a sensor or moving a sensor across a weld to scan the weld and acquire data. The system's laser emitter creates line stripes (structured light), and optical signals deflected from the surface are received by a matrix camera (CCD that works as a video, rather than still, camera) that records a surface pattern profile. The deflection of the beam from the surface depends upon the changes in surface characteristics.

The control system 13 is adapted to control the welding torch 1, the robotic arm 15 and the scanning head 11. More particularly, the control system is adapted to positionally calibrate the scanning head 11 within a localised work envelope 17, the positional calibration being referenced to one or more datum features 19 within the localised work envelope. Conveniently, the scanning head is positionally calibrated along x, y, z linear orthogonal axes within the localised work envelope. This positional calibration within (rather than outside) the localised work envelope can reduce the effect of robotic repeatability inaccuracies, by reducing or minimising travel range of the scanning head post calibration. The localised work envelope is located within a larger space envelope 21, which includes the electrode tip 3 of the robotic welding torch 1.

As an additional step, before positional calibration of the scanning head 11 within the localised work envelope 17, the scanning head may be positioned with reference to a master theoretical model of the first and second components' positions within the space envelope 21. This can improve speed and accuracy of calibration of the scanning head as the scanning head can be positioned in the correct general vicinity of the datum feature and localised work envelope before calibration is attempted.

After positional calibration of the scanning head 11, the scanning head scans profiles of the first component 5 and the second component 7 within the localised work envelope. A cloud point data image of defined coordinate positions of the surfaces and edges to be welded along work piece joins 9 within the space envelope 21 is generated from the scanned profiles of the first and second components.

Following scanning of the first and second components, the robotic arm 15 moves from the first orientation A to the second orientation B. The scanning head then scans the electrode tip 3 of the robotic welding torch 1 using the calibrated scanning head to determine a defined coordinate position of the electrode tip within the space envelope.

Optionally, before the first component 5 and the second component 7 are welded together, the process includes a further step of determining, from the cloud point data image of surfaces and edges to be welded, whether predetermined weld joint characteristics (including, for example, alignment of the first and second components) are satisfied, such that the welding of the first component to the second component can be stopped in the case that predetermined weld joint characteristics are not satisfied.

The first component 5 and the second component 7 are then welded together along work piece joints 9 using the robotic welding torch 1. The control system 13 is adapted to control movement of the robotic welding torch within the space envelope 21, and the robotic welding torch is controlled and tracked using the cloud point data image and the defined coordinate position of the electrode tip 3 such that the electrode tip is held at pre-determined stand-off positions in all axes around the components during the welding process. By controlling the stand-off position of the electrode tip 3 from the work piece join 9 in such a manner, control of component edge and surface height location in relation to the welding torch electrode tip position during welding may be more accurately achieved compared to that achieved by manual operator adjustment. Accordingly, the resultant weld quality can be improved, by removing operator-to-operator variation, introducing greater repeatability and eliminating fatigue-induced errors which may occur in typical known manually-operated processes. This can lead to further benefits including improvements in product quality and repeatability, and corresponding reductions in product unit cost and lead-time. Predictability in estimating the expected lifetime of the welded product may also be improved.

In summary, the above-described apparatus can provide optical vision capability for component edge and surface detection within an automated or robotic environment, translating the captured cloud point data into defined coordinate positions within a space envelope to be used for pre-weld acceptance and to provide in-cycle control of a TIG welding electrode in relation to actual component geometry. The process can also provide variable data capture on joint condition and provide automated pre-weld inspection and decision making. The process can also reduce the impact of variation within the electrode setting process.

While the invention has been described in conjunction with the exemplary embodiments described above, many equivalent modifications and variations will be apparent to those skilled in the art when given this disclosure. For example, although described above in relation to TIG welding, the welding may be another type of welding process. More generally, the invention can be applied to robotised mechanical fastening, where instead of a robotic welding tool, the scanning head is used to scan a fastening tool of a robotic mechanical fastener, which is then controlled using the cloud point data image obtained by the scanning head. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A method for welding a first component to a second component, the method comprising:
   positionally calibrating a scanning head within a localised work envelope, the work envelope being defined by boundaries surrounding the first component and the second component, the positional calibration being referenced to at least one datum feature within the work envelope;
   scanning profiles of the first component and the second component within the work envelope using the calibrated scanning head;
   generating, from the scanned profiles, a cloud point data image of defined coordinate positions of surfaces and edges of the first component and the second component to be welded within a space envelope, the space envelope being larger than the work envelope, which is located inside the space envelope;
   scanning an electrode tip of a robotic welding torch using the calibrated scanning head to determine a defined coordinate position of the electrode tip within the space envelope, the electrode tip of the robotic welding torch being located outside of the work envelope at a time of scanning the electrode tip; and
   welding the first component to the second component using the robotic welding torch, movement of the robotic welding torch being controlled using the cloud point data image and the defined coordinate position of the electrode tip, such that the electrode tip is held at a plurality of pre-determined stand-off positions around the first component and the second component within the work envelope during the welding.

2. The method of claim 1, wherein the scanning head is positionally calibrated along x, y, z linear orthogonal axes within the localised work envelope.

3. The method of claim 1, further comprising, before positionally calibrating the scanning head, positioning the scanning head by reference to a master theoretical model of the position of the first component and the position of the second component within the space envelope.

4. The method of claim 1, wherein the scanning head is attached to a robotic arm having a first orientation for scanning profiles of the first component and the second component, and a second orientation for scanning the electrode tip.

5. The method of claim 1, further comprising determining, from the cloud point data image of surfaces and edges to be welded, whether predetermined weld joint characteristics are satisfied, such that the welding of the first component to the second component is stopped in response to determining that the predetermined weld joint characteristics are not satisfied.

6. The method of claim 1, wherein the scanning head includes a 3D optical visualiser.

7. The method of claim 1, wherein the welding is tungsten inert gas (TIG) welding.

8. A computer control system programmed to control the scanning head and the robotic welding torch to perform the method of claim 1.

9. An apparatus for welding the first component to the second component, the apparatus comprising:
   the scanning head;
   the robotic welding torch; and
   the computer control system of claim 8.

10. A non-transitory computer readable storage medium storing a computer program to be executed on a computer, causing the computer to control the scanning head and the robotic welding torch to perform the method of claim 1.

11. An apparatus for welding a first component to a second component, the apparatus comprising:
   a scanning head;
   a robotic welding torch; and
   a computer control system programmed to:
     positionally calibrate the scanning head within a localised work envelope, the work envelope being defined by boundaries surrounding the first component and the second component, the positional calibration being referenced to at least one datum feature within the work envelope;

control the scanning head to scan profiles of the first component and the second component within the work envelope using the calibrated scanning head;
generate, from the scanned profiles, a cloud point data image of defined coordinate positions of surfaces and edges of the first component and the second component to be welded within a space envelope, the space envelope being larger than the work envelope, which is located inside the space envelope;
control the scanning head to scan an electrode tip of the robotic welding torch to determine a defined coordinate position of the electrode tip within the space envelope, the electrode tip of the robotic welding torch being located outside of the work envelope at a time of scanning the electrode tip; and
control the robotic welding torch to weld the first component to the second component, movement of the robotic welding torch being controlled by the control system using the cloud point data image and the defined coordinate position of the electrode tip, such that the electrode tip is held at a plurality of pre-determined stand-off positions around the first component and the second component within the work envelope during the welding.

* * * * *